2,862,851

ALDOSTERONE, PROCESS FOR PREPARATION AND COMPOSITIONS THEREOF

Tadeus Reichstein and Albert Wettstein, Basel, and Robert Neher, Binningen, Switzerland No Drawing. Application July 20, 1954
Serial No. 444,657

Claims priority, application Switzerland July 24, 1953

9 Claims. (Cl. 167—77)

This invention relates to a biologically highly active chemically unitary new compound and a process for preparing and isolating it from suprarenal glands. Originally the compound was provisionally named electrocortin, but on the determination of its constitution it was named aldosterone. The determination of the constitution of aldosterone is described by Simpson, S. A., Tait, J. F., Wettstein, A., Neher, R., von Euw, J., Schindler, O., and Reichstein, T.: Helv. Chim. Acta 37, 1200 (1954). The compound is $11\beta,21$-dihydroxy-3,20-diketo-4-pregnene-18-al. In solution it reacts mainly as the 11-hemiacetal.

In adrenal extracts there is a complicated combination or mixture of steroids contained in the cortex. Three of these, corticosterone, cortisone and 17-hydroxycorticosterone, are of significant importance in certain natural functions of the adrenal cortex. These three substances can explain to a great extent the action of the gland on carbohydrate and protein metabolism, but not that on mineral metabolism, measured by sodium and water retention and potassium excretion. Of all pure steroids known, 11-desoxycorticosterone has the greatest effect on mineral metabolism in this sense. This substance occurs in adrenal extracts and has also been reported in beef blood, but the quantities are too small to explain the marked effect of these extracts. Fractions from adrenal extracts have been prepared which contained no 11-desoxycorticosterone and which were more effective per unit of weight than the latter.

Recently a new and very sensitive test has been described which makes it possible to measure rapidly any change in the ratio between sodium and potassium excretion in the urine with very small quantities of material. See Simpson, S. A., and Tait, J. F.: Endrocrinology 50, 150 (1952). By this test, adrenal extracts or concentrates which are more effective than 11-desoxycorticosterone have been elucidated, indicating that they contain a factor of high activity that is detachable by paper chromatography. See Tait, J. F., Simpson, S. A., and Grundy, H. M.: Lancet 262, 122 (1952); Grundy, H. M., Simpson, S. A., and Tait, J. F.: Nature 169, 795 (1952); and Grundy, H. M., Simpson, S. A., Tait, J. F., and Woodford, W.: Acta Endocrinol. 11, 199 (1952). Accordingly, prior to the present invention it was suspected that certain suprarenal extracts contained an unknown factor having an effect on mineral metabolism, the chemical nature or constitution of which was unknown. As a result of the present invention, there has been produced a new definite chemical compound having definite chemical and physical properties and remarkable activity in mineral metabolism. Thus, for the first time a pure chemical substance of definite chemical structure capable of synthesis has been made available for therapeutic use when aldosterone is indicated.

In accordance with the present invention from extracts of the suprarenal gland there has now been prepared, isolated and identified, the above mentioned new pure crystalline chemical compound aldosterone, which has remarkable activity in mineral metabolism. Mach, R. S., Fabre, J., Duckert, A., Borth, R., and Duccomun, P.: Schweiz. Med. Wschr. 84, 407–416 (1954), have reported that the clinical symptoms of patients with Addison's disease who received aldosterone disappeared within a few hours after the treatment was instituted. They conclude that "our studies show that aldosterone corrects the clinical manifestations and the electrolyte disturbances of Addison's disease within a few hours and thus that it can keep persons with adrenal insufficiency alive . . . we were impressed by the extraordinary potency of this hormone . . ." The authors also point to the differences between aldosterone and DCA (desoxycorticosterone acetate) in that with the former hypertension did not develop nor signs of water retention as in the case of DCA. Other differences are also mentioned. It is stated that the aldosterone was 20 to 30 times more potent than DCA.

Studies on the physiological action of aldosterone have also been published by Desaulles, P., Tripod, J., and Schuler, W.: Schweiz. Med. Wschr. 83, 1088 (1953), and by Gross, F., and Gysel, H.: Acta Endocrinol. 15, 199–209 (1954), showing the marked activity of the new compound.

Especially pronounced is its action on the metabolism of mineral substances, e. g., sodium retention and potassium excretion. In the test on rats deprived of suprarenal glands, according to Kagawa, C. M., Shipley, E. G., and Meyer, R. K.: Proc. Soc. Exp. Biol. Med. 80, 281 (1952), and also in the sodium and potassium excretion test according to Simpson, S. A, and Tait, J. F.: Endrocrinology 50, 150 (1952), and in the survival test on dogs deprived of suprarenal glands, it possesses in activity at least 25–100 times higher than that of desoxycorticosterone or its acetate which is the most active known compound in mineral metabolism.

In general, the process for isolating aldosterone comprises the following: an extract prepared from the suprarenal gland by known methods with the aid of lipoid solvents is separated by distribution between an aqueous solvent and a solvent immiscible with water and/or by chromatography, if desired, in conjunction with purification by the method of Girard [Helv. Chim. Acta 19, 1095 (1936)], to recover the ketonic portion, and then isolating the active substance (aldosterone) by crystallization from the resulting fractions which are highly active especially in the metabolism of mineral substances.

According to one embodiment, the process comprises separating a suprarenal extract such as described by Cartland and Kuizenga [J. Biological Chem. 116, 57 (1936)], by distribution between an aqueous solvent and a solvent immiscible with water, e. g., aqueous alcohol and petroleum ether, benzene or chloroform; extracting the aqueous phase with a suitable solvent, for example, an ether and chloroform mixture; effecting a chromatographic fractionation of the resulting extract in a column of adsorbent material, washing the column with solvent to fractionally elute the active substance from the adsorbent medium and isolating crystalline aldosterone from the resulting fractions which are especially highly active in mineral metabolism, for example, by crystallization from a mixture of acetone and water. Other embodiments of the process are described in the examples.

The aldosterone obtained in accordance with the present process, for example, from a mixture of acetone and water is crystalline. The air-dried crystals contain water of crystallization, since when the product is subjected to prolonged drying in a high vacuum at about 50° C.

one mol of water is liberated. The melting point of the product before and after drying is between 104 and 112° C. depending on the size of the crystals and the speed at which it is heated. The molten mass crystallizes completely again on further heating, and final melting takes place at about 153–158° C. The last traces often melt a few degrees higher.

It is also possible to obtain a form having a higher melting point, for example, by crystallization from other solvents, e. g. a mixture of acetone and ether. After having become opaque it melts at 165–169° C. The specific rotation of the hydrate is $[\alpha]_D^{23}=+145°\pm2°$ (c.=0.9896 in acetone), and that of the dried supstance is $[\alpha]_D^{23}=+152°\pm2°$ (c.=1.0264 in acetone). By microanalysis the dried product has the empirical formula $C_{21}H_{28}O_5$. The ultraviolet absorption spectrum in the case of the hydrate and also of the dried compound shows the strong band typical of $\alpha:\beta$-unsaturated ketones. It is at 240.0±0.25 m. and has an extinction of which the log. $\epsilon=4.2$. A second distinct band occurs at 308.0±2m$\mu$; log. $\epsilon=1.92$. These values were determined at concentrations of $9.70\times10^{-4}$, $10^{-5}$ and $10^{-6}$ mol per liter in ethanol.

In the infrared absorption spectrum (taken on a Perkin-Elmer double beam instrument, model 21, in chloroform solution at a layer thickness of 0.2 mm., compensated with chloroform of the same layer thickness) there are characteristic bands, inter alia, at 2.79$\mu$ (hydroxyl groups), at 5.85$\mu$ (medium strength), 5.98$\mu$ (strong) and 6.16$\mu$ (medium strength) in the double bond region and at 7.85$\mu$, 9.38$\mu$, 9.62$\mu$, 9.95$\mu$, 10.18$\mu$, 10.41$\mu$ in the fingerprint region.

In order to identify the new active substances there may also be used the speed of migration in the paper chromatogram in the forms according to Zaffaroni, Burton and Keutmann [Science 111, 6 (1950)], or according to Bush [Bio-chemical Journal 50, 370 (1952)], which in the former case is only a little larger than that of cortisone and in the second case lies between that of cortisone and hydrocortisone or coincides with the latter to a large extent. The substance is tested on the paper chromatogram with respect to its capacity for reducing silver diamine or triphenyltetrazolium halide solution, its ultraviolet absorption, with regard to its yellow fluorescence after the action of an aqueous methanolic solution of alkali, and by the failure to give color reactions with phosphoric acid and with antimony trichloride solution. The combination of these properties is absolutely typical for the compound.

Degradation experiments with the new active substance resulted in determining that aldosterone is 11$\beta$,21-dihydroxy-3,20-diketo-4-pregnene-al, and that in solution it enters into reaction as the semi-acetal. The formulae are written to show the two forms and to represent the equilibrium between them.

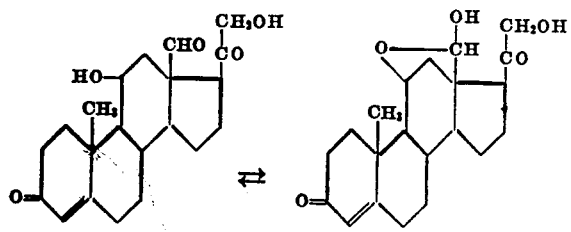

The crude extracts suitable as starting materials for preparing and isolating aldosterone can be obtained by known methods, especially according to the process of Cartland and Kuizenga [J. Biol. Chem. 116, 57 (1936)], or of Swingle and Pfiffner [Proc. Soc. Exper. Biol. Med. 28, 510 (1931); Am. J. Physiol. 98, 144 (1931); Medicine 11, 371 (1932); Proc. Exper. Biol. Med. 29, 998, 1267 (1932)]. It has been found advantageous to follow the procedure of Cartland and Kuizenga only up to the extraction with ethylene chloride.

The splitting up of the extracts in accordance with the present process is carried out, for example, by distribution between an aqueous alcohol, such as methanol of 30 percent strength, or water and a suitable solvent immiscible with water, especially a hydrocarbon such as petroleum ether or benzene, or a halogenated hydrocarbon such as chloroform, or mixtures thereof. This purification can be carried out in apparatus designed for this purpose, for example, that of Craig or Podbjelniak.

Instead of or in addition to such a distribution, chromatography is excellently suited for the purification, such as adsorption chromatography and distribution chromatography. These two principles cannot be entirely distinguished from one another, since as is known also in the case of distribution chromatography the adsorptive properties of the carrier substance play a part. As the carrier there may be used, for example, silica gel, silicates, e. g. magnesium silicate, kieselguhr, cellulose or mixtures thereof, and as solvents, for example, petroleum ether, benzene, acetone, chloroform or mixtures thereof. In combination with one or both of the above methods of enrichment there may be used a mild purification according to Girard, i. e. by means of Girard reagents which give water-soluble ketone derivatives like trimethylammonium- or pyridinium-acetic acid hydrazide, followed by separation and gentle splitting of the latter and recovery of the ketonic portion. In order to carry out the Girard process under mild conditions it is carried out in the absence of an acid such as glacial acetic acid. As solvents for this reaction there are suitable alcohols, for example, methanol.

From the fractions, which are found by the above described paper chromatographic analysis or biological experiments to contain the new compound, the latter can be obtained by crystallization from a suitable solvent or solvent mixture, for example, a mixture of acetone and ether, advantageously in the presence of a small quantity of water, or from aqueous acetone. In the presence of water the hydrate of the active substance is obtained.

The new active substance as indicated above is useful as a medicament in human and veterinary medicine.

The following examples illustrate the invention:

EXAMPLE 1

The preparation of a crude suprarenal extract is carried out according to the process of Cartland and Kuizenga [J. of Biol. Chem. 116, 57 (1936)], in the following manner:

500 kilograms of freeze dried beef suprarenal cortexes are minced and stirred with 1400 liters of acetone for 4 to 6 hours. After removal of the acetone by filtration the residue is again stirred with 1200 liters of 80 percent acetone for 14 to 20 hours at room temperature and the acetone is filtered off. The residue is finally centrifuged with the aid of Hyflo and washed with acetone. Evaporation of the combined acetone solutions (approx. 2700 liters) at 35 to 40° C. in vacuo yields 400 liters of an aqueous extract which is extracted with 300 liters of petroleum ether. The residual aqueous solution is extracted three times with 200 liters of ethylene chloride each time and the extracts are evaporated in vacuo at 35 to 40° C. Depending on the quality of the glands there are obtained in this manner 100–500 grams of crude extract, which is then thoroughly defatted by distribution between aqueous alcohol, for example, methanol of 30 percent strength, and petroleum ether. After removing the alcohol (all the operations being carried out at a temperature below 50° C.) the aqueous phase is extracted four times with the same volumes of a mixture of ether and chloroform (2:1 or 3:1; the solvent must first be thoroughly purified). The combined ether-chloroform solutions are evaporated in vacuo as such or after being washed with dilute hydrochloric acid and hydrogen carbonate solution and dried over sodium sulfate. There are obtained in this manner 23–30 grams of purified extract as starting material for the present process.

The extract is subjected to distribution chromatography in a large column, the stationary phase consisting of 100–200 times the amount of kieselguhr and water in the proportions by weight of 1:1 and petroleum ether, benzene and chloroform serving as the mobile phase. The speed of passage of the eluate should be about 90–100 cc. per hour, and the volume of each fraction 1000–1200 cubic centimeters. The residues obtained by evaporating in vacuo the individual fractions, from some of which several of the known corticosteroids crystallize, are analyzed on the paper chromatogram. The new compound can be localized, for example, with the aid of its $R_F$-value which, in the system according to Zaffaroni, Burton and Keutmann [Science, 111, 6 (1950)], is about the same as that of cortisone, whereas in the systems according to Bush [Biochemical Journal 50, 370 (1952], it lies between the $R_F$-value of cortisone and hydrocortisone or coincides with the latter. The substance can also be localized with the aid of its U. V.-absorption at 240 m$\mu$ and 308 m$\mu$ and its reduction capacity with respect to silver diamine solution, in those fractions which are obtained by elution with a mixture of benzene and petroleum ether in the ratio of 7:3 to 9:1. The fractions in question (300–400 milligrams) are then combined, and then split up in a second column of purified cellulose powder by distribution between aqueous methanol of 60 percent strength and a mixture of petroleum ether and toluene (1:2 to 1:3). The ratio by weight of substance to cellulose amounts to about 1:100 and that of the stationary phase to cellulose amounts to 1:2. About 5 hours are necessary for the passage of a single fraction (40 cubic centimeters). The fractions obtained by evaporation are then again analyzed on the paper chromatogram. The new substance can be crystallized from selected and combined fractions by means of a mixture of acetone and ether, advantageously in the presence of a small amount of water. By recrystallization there are obtained colorless crystals of the hydrate of aldosterone having the double melting point of 104–112 and 153–158° C., which is a unitary compound, and possesses high biological activity in mineral metabolism and has the other properties hereinbefore mentioned. Determination of the carbon-hydrogen content of the preparation after being dried in a high vacuum at 50° C. gives the following results: Carbon 69.68%, hydrogen 8.39%; calculated for $C_{21}H_{28}O_5$: Carbon 69.97%, hydrogen 7.83%. The remaining properties of the dry compound do not substantially differ from those of the hydrate.

EXAMPLE 2

500 kilograms of beef suprarenal cortexes are extracted in the manner described in Example 1. The defatted starting material (24 grams) is first purified by adsorption chromatography on 10 times its weight of silica gel with the aid of methylene chloride, chloroform, acetone and methanol. The fractions controlled by paper chromatography which contain the desired active substance in addition to other compounds (9.7 grams), are purified, and split up on a column with the use of 20 times their weight of cellulose powder between propylene glycol, on the one hand, and cyclohexane, toluene and methylene chloride, on the other. Those fractions which contain a large amount of propylene glycol are freed from the latter after adding an ether-chloroform solution (3:1) by extraction with water.

The fractions (2.9 grams) found to be suitable by paper chromatographic analysis are combined and subjected to a further distribution chromatography over 40 times their weight of cellulose between propylene glycol and benzene. The fractions (about 600 mg.) containing the active substance are finally purified by distribution chromatography as described in Example 1. The new compound can then easily be crystallized in the manner described in Example 1.

Instead of carrying out the distribution chromatography in a tube it may be carried out on paper sheets with the use of the systems propylene glycol toluene or aqueous methanol-petroleum ether toluene or benzene or ethyl acetate.

EXAMPLE 3

An extract (25 grams) obtained from 500 kg. of beef suprarenal glands and purified as described in Example 1 is allowed to stand with a Girard reagent "T" in solution in methanol. Water is then added, the mixture is extracted with a mixture of chloroform and ether (1:3), the aqueous portion is given a pH value of about 1 with dilute hydrochloric acid, and after ¼ hour the ketonic portion set free is extracted with a mixture of chloroform and ether (1:3). The regenerated keto-fraction (4.8 grams) is subjected to distribution chromatography twice as described in Example 1.

An advantageous modification consists in carrying out the splitting up of the ketonic constituents by the Girard method only after the first distribution chromatography with the selected fractions, and then subjecting the keto-fraction (80 mg.) so obtained to the second distribution chromatography on a cellulose column or on paper sheets.

The fractions found by the paper chromatographic analysis to contain especially large amounts of the active substance are crystallized in the manner described in Example 1 or from a mixture of acetone and water.

EXAMPLE 4

100 kg. of suprarenal glands of pigs are extracted as described in Example 1. The very fatty extract (151 g.) is then distributed between sodium chloride containing methanol of 30 percent strength and petroleum ether. The aqueous alcoholic solution containing the corticoids is then concentrated under reduced pressure to 250 cc. and extracted five times with 1 liter of a 3:1 mixture of ether and chloroform each time. After being dried over sodium sulfate the solvent mixture is distilled off in vacuo. The 38 grams of the resulting extract are chromatographed through a column containing the 100-fold quantity of a mixture of kieselguhr and water in the ratio of 1:1. As mobile phase there is used petroleum ether saturated with water to which there are gradually added in the course of the chromatography increasing quantities of benzene. Paper chromatographic analysis shows the presence of aldosterone in the eluates with 70 percent of benzene. These fractions are combined (380 mg.) and chromatographed through a column containing the 200-fold quantity of purified cellulose powder with the use of the system water-methanol-benzene-petroleum ether 5:5:3:7 and 1:1:1:1, the ratio by weight of the cellulose and the lower (stationary) phase being 2:1. From the fractions selected by paper chromatographic analysis the active substance can be crystallized from mixture of acetone, ether and water. From the mother liquors further quantities can be crystallized after paper chromatographic purification. By recrystallization from a mixture of acetone and ether the aldosterone is obtained in the form of colorless crystals melting at 165–169° C. (after becoming opaque at 130° C.).

EXAMPLE 5

500 kilograms of beef suprarenal cortexes are extract in the manner described in Example 1. The defatted starting material (27 grams) is dissolved in 50 cc. of acetone, mixed with 25 g. of kieselguhr-water (1:1) and the acetone completely removed in vacuo. The whole is then suspended in petroleum ether and placed in a column, containing 1.4 kilograms of kieselguhr moistened with 1.4 kilograms of water and suspended in petroleum ether, and after being allowed to settle and pressed firmly, it is covered with paper filter circles cut to fit the column.

Finally, a layer (25 g.) of fresh kieselguhr-water is added in an analogous manner and again covered with some circles of filter paper. The whole is then chromatographed at 20° C. the speed of passage being about 100 cc. per hour. As mobile phase there are used: petroleum ether, mixtures of petroleum ether and benzene, mixtures of benzene and chloroform, and chloroform (all the solvents are saturated with water). In the eluates which are obtained with a mixture of benzene and petroleum ether in the ratio of 65:35 to 75:25, the new hormone can be detected by paper chromatography analysis. (C-system according to Bush Biochemical Journal, volume 50, page 370 (1952), or propyleneglycoltoluene system such as that of Neher and Wettstein, Helv. Chem. Acta (1951), volume 34, page 2278). These fractions (324 mg.) are subjected for further purification to a second distribution chromatography. As carrier there are used 60 g. of washed cellulose powder which are mixed with 30 cc. of the lower phase of the following solvent system: 666 cc. of toluene, 333 cc. of petroleum ether, 400 cc. of water and 600 cc. of methanol. As mobile phase the upper layer of this system, is used at the beginning and later that consisting of 750 cc. of toluene, 250 cc. of petroleum ether, 400 cc. of water and 600 cc. of methanol.

The material to be separated (324 mg.) is dissolved in 2 cc. of the heavier phase (a small quantity of the material remains undissolved) and mixed with 4 g. of cellulose powder and placed on the column. The small quantity of undissolved residue is now taken up with 1 cc. of the heavier phase and 2 cc. of cellulose powder and also placed on the column. After placing a circle of filter paper on top, 2 g. of cellulose powder mixed with 1 cc. of the heavier phase are added, well pressed and chromatographed with the lighter phase. The speed of passage is 8–9 cc. per hour, temperature 20° C. All the fractions are evaporated in vacuo at 35° C. bath temperature. For the fractions 34–44 a mixture with a higher content of toluene is used, and from fraction 45 onwards the lighter phase of a mixture of 10 parts of pure benzene, 4 parts of water and 6 parts of methanol.

The following table shows the result of the chromatography:

| Fraction No. | Volume | Hours | Evaporation residue weight, milligrams | Products obtained |
|---|---|---|---|---|
| 1 | 15 | 2.5 | 1.3 | amorphous, brown. |
| 2 | 14.3 | 2 | 8.0 | Do. |
| 3 | 16 | 2 | 10.1 | Do. |
| 4 | 8 | 1 | 6.8 | Do. |
| 5 | 12 | 1.5 | 11.8 | Do. |
| 6 | 12 | 1.5 | 16.0 | granules. |
| 7 | 16 | 2 | 17.3 | Do. |
| 8 | 16 | 2 | 11.5 | spears. |
| 9 | 16 | 2 | 8.8 | amorphous + traces of crystals |
| 10 | 15 | 2 | 7.0 | amorphous, increasingly paler. |
| 11 | 13.5 | 2.5 | 6.0 | Do. |
| 12 | 15.3 | 2 | 7.4 | Do. |
| 13 | 17 | 2 | 5.7 | Do. |
| 14 | 21 | 2.5 | 6.0 | Do. |
| 15 | 22 | 2.5 | 5.0 | Do. |
| 16 | 22 | 2.5 | 3.6 | Do. |
| 17 | 22 | 2.5 | 3.0 | Do. |
| 18 | 43 | 5 | 4.6 | Do. |
| 19 | 42.5 | 5 | 4.4 | |
| 20 | 38 | 5 | 4.4 | 19–21 few needles—subliming at 235–255° C. |
| 21 | 42 | 5 | 4.5 | |
| 22 | 42 | 5 | 3.9 | crystals. |
| 23 | 44 | 5 | 4.3 | amorphous + traces of crystals. |
| 24 | 44 | 5 | 3.8 | Do. |
| 25 | 45 | 5 | 4.4 | jelly. |
| 26 | 46 | 5 | 3.6 | Do. |
| 27 | 47 | 5 | 3.9 | amorphous. |
| 28 | 41 | 5 | 4.6 | few spherical clusters. |
| 29 | 41 | 5 | 2.2 | amorphous. |
| 30 | 46 | 5 | 3.3 | Do. |
| 31 | 46 | 5 | 2.1 | Do. |
| 32 | 40 | 5 | 2.8 | crystallizing on inoculation. |
| 33 | 30 | 5 | 4.6 | crystalline aldosterone. |
| 34 | 35 | 5 | 6.0 | Do. |
| 35 | 38 | 5 | 9.8 | Do. |
| 36 | 40 | 5 | 11.0 | Do. |
| 37 | 35 | 5 | 7.8 | Do. |
| 38 | 28 | 5 | 4.9 | Do. |
| 39 | 30 | 5 | 4.0 | crystallizing on inoculation. |
| 40 | 35 | 5 | 4.1 | amorphous. |
| 41 | 37 | 5 | 4.4 | Do. |
| 42 | 41 | 5 | 6.8 | Do. |
| 43 | 36 | 5 | 4.4 | Do. |
| 44 | 28 | 5 | 3.0 | Do. |
| 45 | 41 | 5 | 3.8 | Do. |
| 46 | 45 | 5 | 9.0 | Do. |
| 47 | 45 | 5 | 17.8 | Do. |
| 48 | 48 | 5 | 14.1 | Do. |
| 49 | 49 | 5 | 5.6 | Do. |
| 50 | 29 | 5 | 3.6 | Do. |
| 51 | 42 | 5 | 3.7 | Do. |
| 52 | 44 | 5 | 3.6 | Do. |
| 53 | 44 | 5 | 4.1 | spherical clusters. |
| 54 | 38 | 5 | 3.3 | melting point, 220–235° C. |
| 55 | 28 | 5 | 1.9 | trace of crystals. |
| 56 | 80 | 10 | 2.6 | amorphous. |
| 57 | 100 | 14 | 1.2 | Do. |

The fractions 32–39 which chiefly contain the new hormone spontaneously yield crystal clusters from a little moist acetone with ether after being allowed to stand for several hours at 0° C. (melting point=104–107° C., which after being heated cautiously slowly solidify with a second melting point at 154–157° C.). When tested by paper chromatography the product is found to be uniform. The main quantity is colorless. The combined mother liquors yield an abundant quantity of crystals which have a slightly yellow color. Purification can best be carried out as follows: The crude crystals are dissolved in a little acetone, containing 10% water, mixed with the five-fold quantity of ether and filtered through a small layer of compressed cotton wool (about 3mm. thick and 5 mm. long) which has been well washed beforehand with a mixture of acetone and ether. The whole is then well washed with the same solvent, the clear colorless filtrate is concentrated to a small volume and cautiously diluted with ether. After inoculation, crystallization starts immediately, and is completed when the whole has been allowed to stand for several hours at 0° C. with the gradual addition of ether. It is then washed with a little acetone and ether mixture (about 1:10), pure ether and pentane. Yield of crude crystals 22.5 mg. These are filtered again in a similar manner and recrystallized, and yield 21.8 mg. of the analytically pure active substance aldosterone.

Aldosterone can be used as medicament, for example, in the form of pharmaceutical preparations which contain it in admixture with a pharmaceutical organic or inorganic solid or liquid carrier material suitable for enteral, parenteral or topical aplication. For the production of these preparations such substances are concerned as do not react with the new compound, so for example water, gelatine, lactose, starch, magnesium stearate, talc, vegetable oils, benzyl alcohols, gums, polyalkylene glycols, vaseline, cholesterol, or other medicament carriers. The pharmaceutical preparations can take the form of, for example, tablets, dragees, or are in liquid form with aldosterone dissolved or suspended, for example, in microcrystalline or emulsified form. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are obtained by the usual methods, and can be prepared in any desirable dosage unit from, e. g., tablets, ampules and the like. The percentage of aldosterone may be varied, the aldosterone being present in an effective amount. Thus, the range of concentration of aldosterone may vary from about 0.005 percent to about 50 percent. Tablets may contain from about 0.05 mg. to about 500 mg. and suspensions and solutions from about 50γ to about 500 mg. per cc. For example the following preparations can be made:

1. *Oily injection solution (ampules of 100γ per 1 cc. for injection)*

| | |
|---|---|
| Aldosterone | 100γ |
| Neutral sesame oil free from peroxide to make up to 1 cc. | |

2. *Aqueous suspension for injection: (0.1 mg per 1 cc.)*

| | Mg. |
|---|---|
| Aldosterone | 0.10 |
| Na-carboxymethyl cellulose | 5.00 |
| Sodium chloride | 7.50 |
| Primary sodium phosphate | 2.00 |
| Secondary sodium phosphate | 1.00 |
| Mercury sodium thiosalicylate | 0.01 |
| Sorbitan-monolaurate ethylene- oxide ether | 1.00 |
| Distilled water to make up to 1.00 cc. | |

3. *Tablets*

| | |
|---|---|
| Aldosterone | 1.00 |
| Lactose | 53.00 |
| Gelatin | 1.00 |
| Starch | 39.50 |
| Magnesium stearate | 0.30 |
| Talc | 5.20 |
| | 100.00 |

4. *Tablets for mucosal absorption*

| | |
|---|---|
| Aldosterone | 1.00 |
| p-Stearoyl-amino-phenyl-trimethyl-ammonium-methylsulfate | 0.05 |
| Lactose | 75.00 |
| Confectioners' sugar | 85.00 |
| Stearin | 2.00 |
| Talc | 11.95 |
| | 175.00 |

What is claimed is:

1. A process for the isolation from suprarenal glands of biologically active, chemically unitary, crystalline product of manufacture, aldosterone, which comprises the steps of separating by partition chromatography on kieselguhr between water, and benzene and petroleum ether, an extract obtained from suprarenal glands with lipoid solvents, collecting the eluates obtained with benzene-petroleum ether in the ratio from 63:35 to 90:10, evaporating the solvents, separating the residue by a second chromatography on cellulose between water-methanol (4:6) and toluene-petroleum ether, collecting the eluates obtained with toluene-petroleum ether in the ratio 3:1, evaporating the solvents, and crystallizing the residue from acetone-ether whereby crystalline aldosterone is obtained.

2. A crystalline product of manufacture, aldosterone.

3. The hydrate of the compound of claim 2.

4. A pharmaceutical preparation comprising from about 0.005% to about 50% of crystalline aldosterone and a pharmaceutical carrier, said composition being substantially free from substances which are associated with aldosterone in suprarenal glands.

5. A pharmaceutical preparation comprising from about 0.05% to about 50% of crystalline aldosterone and a solid pharmaceutical carrier, said composition being substantially free from substances which are associated with aldosterone in suprarenal glands.

6. A pharmaceutical preparation comprising from about 0.005% to about 50% of crystalline aldosterone and a liquid pharmaceutical carrier, said composition being substantially free from substances which are associated with aldosterone in suprarenal glands.

7. A pharmaceutical preparation in dosage unit form comprising from about 0.05 mg. to about 500 mg. of crystalline aldosterone per dosage unit, said composition being substantially free from substances which are associated with aldosterone in suprarenal glands.

8. A pharmaceutical preparation in dosage unit form comprising from about 0.05 mg. to about 500 mg. of crystalline aldosterone, said composition being substantially free from substances which are associated with aldosterone in suprarenal glands and being in tablet dosage unit form.

9. A pharmaceutical preparation in dosage unit form comprising from about 0.05 mg. to about 500 mg. of crystalline aldosterone per dosage unit, said composition being substantially free from substances which are associated with aldosterone in suprarenal glands and being in liquid dosage unit form.

References Cited in the file of this patent

UNITED STATES PATENTS

| | | |
|---|---|---|
| 753,177 | Takamine | Feb. 23, 1904 |
| 1,061,148 | Turner | May 6, 1913 |
| 2,447,463 | Hershberg | July 25, 1947 |

OTHER REFERENCES

Simpson et al.: Memoirs for Soc. of Endocrinology, May 21, 1953, vol. 2, pp. 9–24.
Chem. and Eng. News, 33:34, Aug. 22, 1955, pp. 3486–3487.
Helveta Chem. Acta, 37, 1954, pp. 1163–1223.
Nature, May 10, 1952, pp. 795–796.
Acta Endrocrinol, 11 (1952), pp. 199–220.

UNITED STATES PATENT OFFICE
CERTIFICATE OF CORRECTION

Patent No. 2,862,851 December 2, 1958

Tadeus Reichstein et al.

It is hereby certified that error appears in the printed specification of the above numbered patent requiring correction and that the said Letters Patent should read as corrected below.

Column 1, line 52, for "detachable" read -- detectable --; column 3, line 19, for "m." read -- m --; column 8, line 69, for "from" read -- form --.

Signed and sealed this 7th day of April 1959.

(SEAL)
Attest:

KARL H. AXLINE
Attesting Officer

ROBERT C. WATSON
Commissioner of Patents